United States Patent Office 3,437,073
Patented Apr. 8, 1969

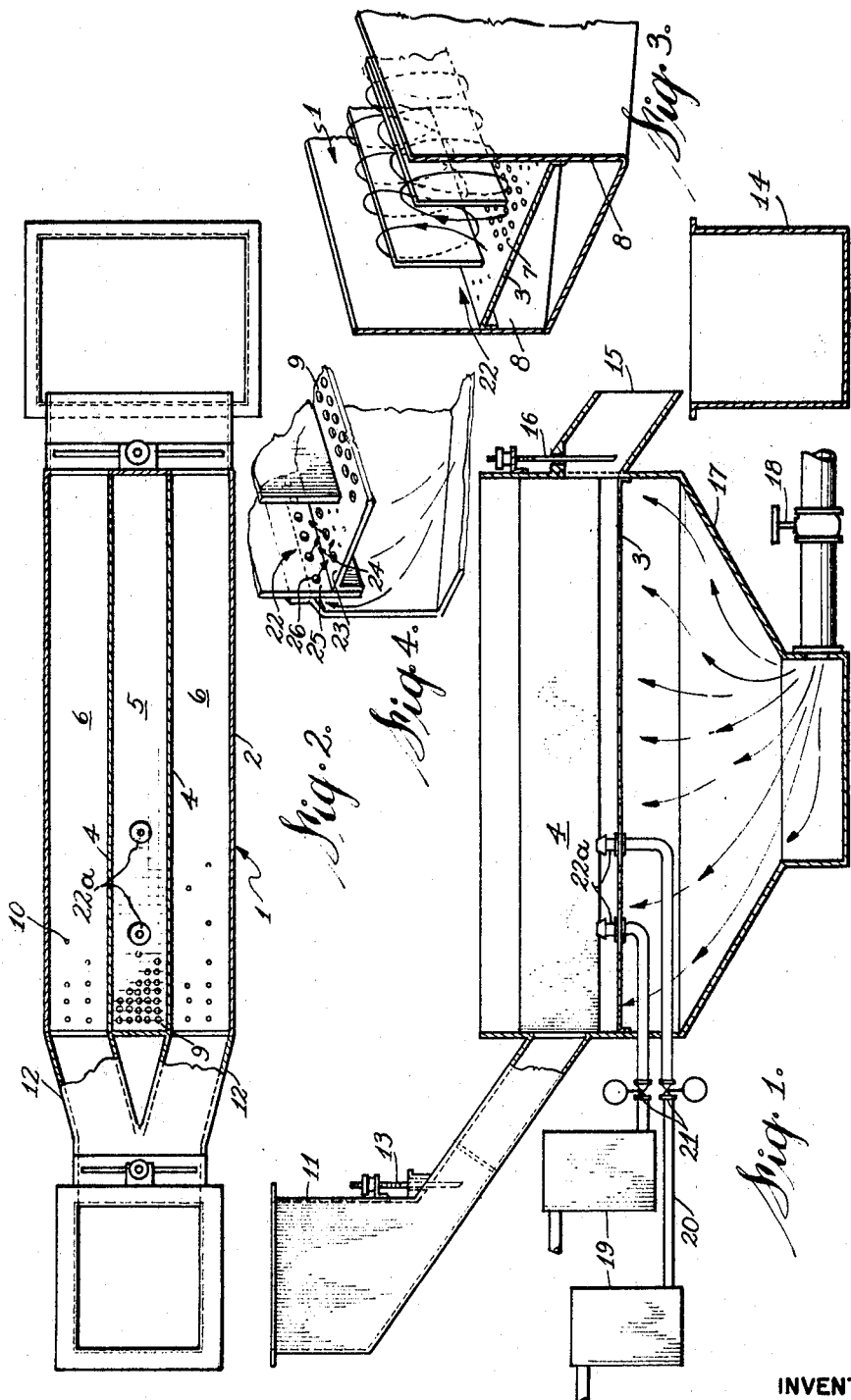

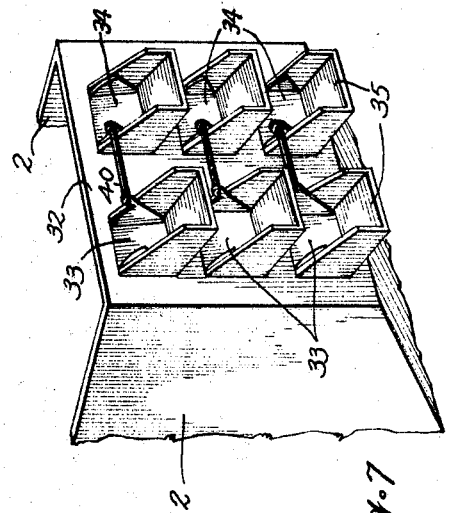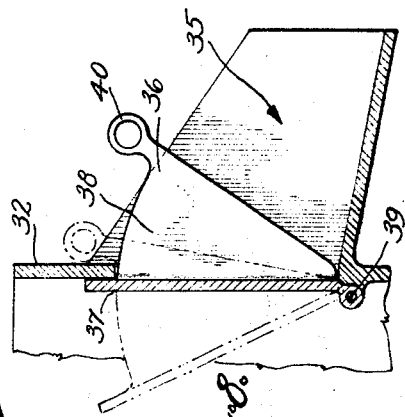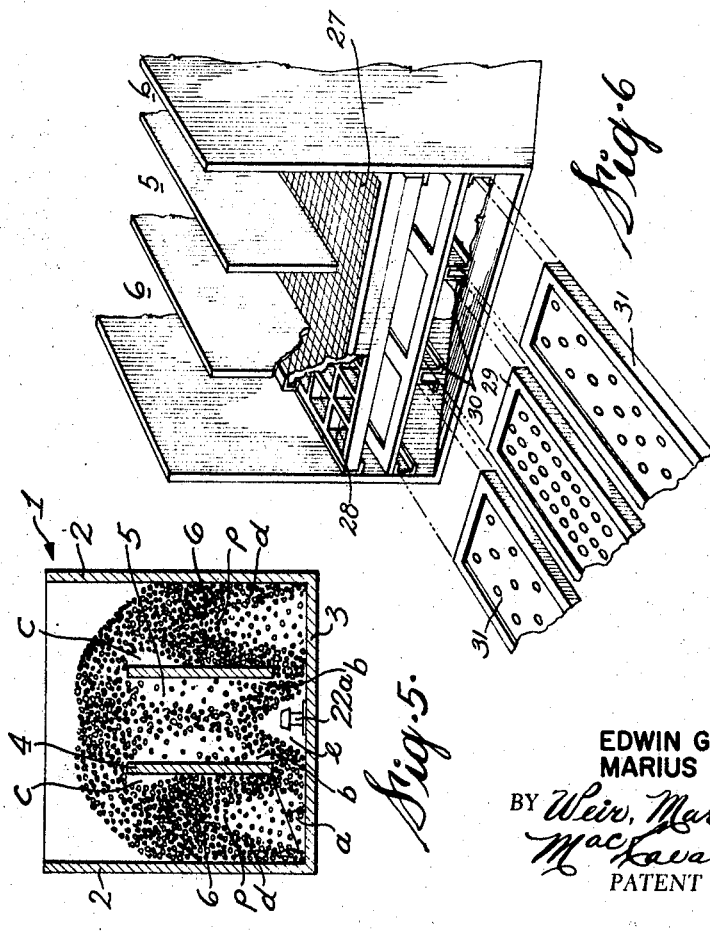

3,437,073
METHOD AND APPARATUS FOR TREATING PARTICULATE MATERIAL IN A FLUIDIZED BED
Edwin George Drake, La Salle, Quebec, and Marius Frechette, Ville St. Michel, Quebec, Canada, assignors to Wisconsin Alumni Research Foundation, Madison, Wis., a corporation of Wisconsin
Filed Dec. 1, 1965, Ser. No. 510,822
Int. Cl. B05c 5/00; B44c 1/06, 1/08
U.S. Cl. 118—24    6 Claims

ABSTRACT OF THE DISCLOSURE

Apparatus for continuous treatment of particulate material while in a fluidized state consisting of a longitudinally extending trough, the base of which trough contains spaced apertures, divider plates within the trough which divide the trough into a longitudinally extending central zone and two side zones which communicate above and below the divider plates, means for forcing a fluidizing gas upwardly through the apertures in the base of the trough and means for dispersing particle treating material within the trough.

---

This invention relates generally to method and apparatus for treating particulate material in a fluidized bed.

The present state of the relevant art is illustrated by the teachings of Dale E. Wurster in for example his United States Patents 2,648,609 and 2,799,241 and his Canadian Patent 656,429 which show a vertical chamber in which particulate material is fluidized in a spray of coating material in a batch process. Adaptation of the Wurster technique to a continuous process is discussed in two articles by Scott et al. in Journal of Pharmaceutical Sciences, volume 53, No. 3, March 1964, p. 314.

The object of the present invention is to provide an improved method and apparatus which can be operated continuously for treating particulate material in a fluidized bed.

Broadly the apparatus of the invention comprises an elongated trough consisting essentially of a pair of upstanding side walls and a base, a pair of upstanding elongated divider plates spaced apart and between and from said side walls and spaced from said base, longitudinally dividing the major portion of the interior of said trough into a central zone and two side zones, the central strip of said base, underlying said central zone having a series of substantially regularly spaced apertures therein, and means for forcing a substantial volume of fluidizing gas through the apertures in said central strip.

Broadly the method comprises feeding particulate material into one end of an elongated trough which is divided longitudinally into a central zone and two side zones by a pair of suspended divider plates, forcing fluidizing gas upwardly through said central zone with sufficient force to lift the particles of said particulate material above said divider plates, dispersing a particle treating composition within said trough, withdrawing treated particles from said other end of said trough and regulating the introduction rate, the withdrawal rate and fluidizing gas flow so as to cause said particles to move through the treating composition in a generally helical mean path around each said divider plate from adjacent said one end to adjacent said other end of said trough.

In this specification and in the claims hereto the terms "particulate material" and "particle" include small discrete articles as well as finely divided material. For example the terms include seeds and pills as well as pieces of crushed ore.

The word "fluidized" and other parts of the same word herein means the state in which gas passing through a layer or bed of particles, imparts to the layer or bed flow properties approaching those of a liquid and includes the state in which the particles achieve a velocity in the direction of the gas flow, the state in which the particles have a velocity in a direction substantially opposite to that of the gas flow and the state in which the bed is essentially static but will flow under a pressure differential materially smaller than that necessary to cause flow in a like bed through which no gas is passing.

Further the term "mean path" as used herein in reference to the particle path is referable to the theoretical path of a particle within the machine subjected to input, output, fluidizing gas and gravity forces only.

Embodiments of the invention are further described with reference to the accompanying drawings in which:

FIGURE 1 is an elevation view partly in section showing an embodiment of the invention, FIGURE 2 is a plan view partly in section of the embodiment of FIGURE 1, FIGURE 3 is a perspective view of a portion of the trough of FIGURE 2 showing the arrangement of apertures and the particle path, FIGURE 4 is a perspective view of part of the trough showing a modified arrangement of apertures in the side zone, FIGURE 5 is a representational elevation in section through the trough illustrating a particle flow pattern, FIGURE 6 is a perspective view of one end of the trough of another embodiment, FIGURE 7 is a perspective view of the discharge end of the trough illustrating discharge means, FIGURE 8 is a side view in section along line 8—8 of FIGURE 7.

In FIGURES 1, 2 and 3 trough 1 has a pair of upstanding side walls 2 and a base 3. A pair of divider plates 4 are arranged between side walls 2 spaced therefrom, spaced apart and spaced from said base 3 so as to divide the trough 1 longitudinally into a central zone 5 and a pair of side zones 6. The base 3 is divided longitudinally into a central strip 7 and two side strips 8 corresponding with the zones 5 and 6 respectively. There are a large number of small apertures 9 in the central strip 7 and a much smaller number of apertures 10 in the side strips 8.

Feed hopper 11 is positioned above the trough 1 for gravity feed and preferably has a pair of conduits 12 to permit feeding into the side zones 6. A valve 13 permits the feed flow to be controlled. Feed under mechanical pressure may also be used as by a screw conveyor from a bin or other common means.

Discharge bin 14 preferably sits below the level of the trough 1 to permit gravity discharge through conduit 15 which also has a valve 16 to control the discharge rate.

Beneath the base there is a housing 17 to distribute fluidizing medium under pressure to the strips of apertures 9 and 10 and a valve 18 to regulate the flow of fluidizing medium. The necessary volume and pressure of fluidizing medium can be obtained from well known means such as a fan (not shown).

The treating chemicals may be contained in vats 19 which can be under pressure as from compressed air lines 20 and can be heated if necessary. Flow can be controlled by valves 21 and the discharge is through nozzles 22a which are preferably positioned in the central zone near the feed end of the trough so that there will be a fairly long drying zone. Appropriate disposition of the nozzles will be apparent from the character of the particular application of the invention. Airless coating material systems may be used especially when uniformity of coating is important.

In operation, particulate material to be treated is loaded into the hopper 11 and fed by gravity through conduits 12 into preferably the side zones 6 of the trough 1. The fluidizing medium is pumped under pressure into the housing 17 and passes through the central and side strips of apertures to fluidize the particulate material. The apertures are arranged so that the particles will be carried upwardly in the central zone but will fall in the side zones although even in the sides zones it is desirable that there be fluidizing to an extent such that the bed of falling particles will act much like a liquid. Thus the particles at the bottom of the side zones will move toward and into the central zone to replace the particles carried upwardly and will themselves be caught up. At the top of the central zone the particles will tend to fall outwardly and then downwardly in the side zones so that the path of a particle is one of rotation around the divider plates. There is, however, a longitudinal force component from the new feed entering the trough and thus the mean particle path is generally helical.

FIGURES 2 and 3 illustrate a simple embodiment of the invention and it will be convenient to discuss design considerations for particular applications with reference to this simple embodiment. There will be no difficulty in recognizing when the device is functioning adequately for a particular application. The particles in the central zone 5 should achieved a velocity in the direction of the fluidizing gas flow while between the plates 4, and within the bed between the plates virtually all particles preferably should be surrounded by a film of air. Obviously the pressure drop decreases from a point at the base 3 up through bed to a point above the plates 4 at which the weight of the particle overcomes the pressure drop and the particle begins to fall. A falling particle falls in a path of least resistance and therefore falls into either of the side zones 6 and in practise a mushroom pattern develops. A break at the rate of decrease of pressure drop occurs at the top of the plates 4 and thus over a range of suitable operating conditions the particle direction reversal, or in other words the mushrooming of the bed, will occur closely above the top of the divider plates 4. It is generally preferable that conditions be controlled to achieve the mushrooming just above the top of the plates to save energy and also so that any treating material, not yet deposited will encounter the relatively compacted mushroom as it losses a velocity increment upon passing the top of the plates 4. In this connection it will be appreciated that within the mushroom the particles tend to become momentarily stationary before starting to fall providing an opportunity to receive any remaining amounts of coating material just as the latter likewise losses a velocity increment.

The fall of a particle in a side zone 6 is preferably not a free fall but a cushioned fall such that the bed of particles within each zone 6 is gradually falling and fluidized. The greater weight of particles in each side zone 6 than in the central zone 5 creates a horizontal pressure drop at the bottom of the trough 1 from the side zones 6 to the central zone 5. Likewise the air flow against the particles through side zones 6 as opposed to the flow through the central zone 5, contributes to the maintenance of the said pressure drop. Since the plates 4 are spaced from the base 3 and because the beds in the side zones 6 tend to have liquid flow characteristics, a modest horizontal pressure drop is sufficient to cause particle flow from zones 6 to zone 5. It has further been experienced that there is a tendency for the fluidizing air in zones 6 to peak somewhat which tends to induce the particle fall to flow downwardly more to the sides than in the center of the zone.

The result is that the average particle is fluidized and carried upwardly in zone 5 to a point above the top of plates 4, then falls in a fluidized state through a side zone 6, encounters the pressure differential between zones 6 and 5 and flows beneath plate 4 back into zone 5 for repetition of the pattern. When the device is under a continuous operation the feeding of particles into one end of the trough creates a longitudinal pressure to which the particle being fluidized, will readily respond and accordingly the mean path of travel through the device is a generally helical path around each of the divider plates.

There are a number of design and control factors which will affect the pattern of flow within the device for a particular application. Likewise the applications vary widely and thus it is not feasible to offer a mathematical formula for achieving optimum operation for all applications in all machines embodying the invention. However, the effects of variation of several design and control factors are hereinafter discussed and since achievement of the aforesaid "helical flow" is readily apparent to the eye there should be no difficulty in practising this invention from the teachings of this specification.

The height of trough side walls 2 will depend on the size of the fan, the pressure under which it will be operated, and the weight of the lightest particles to be treated. The capacity desired will also be a factor. For example, to sugar coat puffed wheat it might be desirable that the height of side walls 2 be up to about 6 feet or more. On the other hand for applying, for example, a protective coating to metallic fasteners or an adhesion promoting agent to rock particles even with a very large blower it may not be necessary to have a height of more than 2 feet. Preferably the height of side wall 2 is such as to extend about 3" or more above the top of divider plates 4. Clearly the wall should be high enough to catch in the trough all the particles from the spread of the mushroom.

The height of the divider plates is related to the application, the thickness of coating to be applied and the drying requirements. For efficient operation the divider plates should extend a short distance above the height of the bed in side zones 6. Obviously the top of the plates must not be below the top of the fluidized bed in zones 6. In applying a tacky coating it may be desirable to use high divider plates and high pressure fluidizing coating in the lower region and using the upper region for drying before the coated particles come closer together in the mushroom and in the side zone beds.

The spacing of the bittom of plates 4 from the base 2 is dependent on capacity. Further it has been ascertained that it is preferable that the angle shown as $a$ in FIGURE 5 between the base and a line joining the outside edge of the base with the bottom of adjacent plate 4 should be at least about 30° so that flow of particles from the outward edge of the side zone 6 is regular and not subject to undue turbulence and eddying.

The width of central zone 5 is dependent on capacity and particle weight relative to the fan size. The width of each side zone 6 involves like considerations and the desirability of carrying across particles from the outside edge by means of the pressure differential between zones 6 and 5 so as to avoid stagnation of particles along the bottom outer edge of the trough. Air aperture positioning along the outer edges described hereinafter assists in that regard. In some applications such as cleaning seed grains, fluidizing in side zones 6 may not be necessary and the side walls 2 may be incined inwardly at the base 3 to provide in effect a hopper type gravity feed back into zone 5.

The ratio of the width of central zone 5 to the width of the trough 1 is important as related to the respective aperture areas in zones 5 and 6 and the fan static pressure to achieve appropriate fluidization in zones 5 and 6, respectively. Further if zone 5 were too high and narrow the pressure at the base could become higher in zone 5 than in zones 6 under which condition the necessary "helical flow" would not be obtained. It has been found that a generally suitable ratio is about 1 to 4. As zone 5 is made relatively wider there is a tendency to experience spouting of the air through the bed which interferes with the desired flow pattern. As the zone 5 is made relatively narrower there is a decrease in capacity and a greater ture. A pair of scoops 36 is associated with each pair of discharge apertures. Each scoop consists of a closure plate 37 and a pair of sector shaped side walls 38 extending from the sides of said closure plate. The scoop is pivoted at the bottom thereof on pin 39 and adjacent side walls 38 of each pair of scoops 36 are connected together by control bar 40. In closed position as shown in FIGURES 7 and 8 closure plates 37 close the two series of discharge apertures 33 and 34. In the operation of the apparatus for a particular application the desired height of the beds in side zones 6 is ascertained and accordingly the pair of scoops 36 at the appropriate height is pushed inwardly by moving its control bar 40 toward the discharge end wall 32. Treated particles from side zones 6 will drop into the scoops 36 and on through the discharge apertures out of the trough guided by chutes 35. The particle flow rate will determine how far the scoops should be opened inwardly. For very heavy flow it may be necessary to open more than one pair of scoops or even all pairs of scoops.

Many equivalent discharge control means will be readily apparent but that described is simple and gives a substantial range of control.

The following examples are illustrations of the operation of the invention. The apparatus used was similar to that shown in FIGURES 2, 3 and 6. The base 3 was 10" long and 8" wide, the side walls 2 were 18" high, the divider plates 6½" high by 10" long set 1¾" apart and 1¾" from the base 3. A screen 27 and then honeycomb 28 were used and a Buffalo volume fan r.p.m. 3450. The air flow measurements were taken in miles per hour at the fan intake and the pressures at the base in inches of water. OAC herein represents the open area of the central strip 7 relative to the total area of the base (80 square inches). OAS represents the open area of both side strips 8 relative to the total area of the base. In these examples OAS includes extra apertures 26 in corner strips 25.

*Example 1*

Using plates providing OAC=7.5% and OAS=8.5% introduction of 11 pounds of wheat seeds was commenced and the air speed adjusted to 100 m.p.h. Good circulation was established with the height of the fluidized side beds at about 5½" from the base and the central bed about 7½". The inlet and outlet were opened to pass about 4 bushels or 224 pounds per hour through the machine and a fine spray coloured sugar and water solution was introduced into the central zone 5 at the rate of about 8 ounces (dry weight) per hour. The wheat was evenly colored.

*Example 2*

The conditions of Example 1 were established using for the coating 3 ounces per hour of an aqueous solution containing 0.5% rhodamine dye, 0.2% methyl cellulose and 6.5% phenylmercury acetate. The wheat was evenly coated.

*Example 3*

The conditions of Example 1 were established using for the coating 20 ounces per hour of a 50/50 methylene chloride and alcohol mixture containing 10% of a blend of 80 parts Methocel MC 10 cps., 10 parts carbowax 4000 and 1 part Pontacyl Green NV Conc.

*Example 4*

Using plates providing OAC=7.5% and OAS=13.8% 18 ounces of puffed rice was introduced with an air speed of 35 m.p.h. Using a seed flow rate of 36 ounces per minute a 20% honey in water solution was sprayed into the central zone at the rate of 0.5 ounce per minute and an even coating was obtained.

*Example 5*

Using plates as in Example 4, 11 pounds of flax seed was introduced with an air speed of 80 m.p.h. Using flow of 4 bushels or 240 pounds per hour, well coated seeds were obtained using a spray of Methocel, alcohol and 6.5% phenylmercury acetate at the rate of 8 ounces per hour.

Applications of the invention are diverse. It may be used for coating seeds with fungicides, bacteriacides colour and growth promoting agents or mixtures for coating pharamaceutical pills and tablets, dry cereals, and other food products. It may be used for granulating and for reacting particles chemically especially where the reaction requires contacting a solid in particulate form with one or two reactants in a disperse liquid or gaseous phase. It will be appreciated that such latter reactants may be carried in either the fluidizing medium or in the spray and that one may be a catalyst.

The embodiments of the invention in which an exclusive property or privilege is claimed are defined as follows

We claim:

1. Apparatus for treating particulate material in a fluidized state consisting essentially of an elongated trough composed of a pair of upstanding side walls and a base, a pair of upstanding divider plates spaced apart and between and from said side walls and spaced from said base, longitudinally dividing the major portion of the interior of said trough into a central zone and a pair of side zones, the central strip of said base underlying said central zone have spaced apertures therein, means for forcing a substantial volume of fluidizing gas upwardly through said apertures, means for dispersing particle treating material within said trough, and means for feeding particulate material into said trough and for withdrawing it therefrom.

2. Apparatus as defined in claim 1 in which the side strips of said base underlying said side zones each has a series of spaced apertures therein, the ratio of aperture area to strip area being substantially greater in said central strip than in said side strips.

3. Apparatus as defined in claim 2 in which said trough has a corner strip adjacent the juncture of each said side wall with said base, having a third series of apertures in each.

4. Apparatus as defined in claim 3 in which the ratio of the aperture area of said first series to the aperture area of said second and third series is from 1:1 to 1:3.

5. Apparatus as defined in claim 1 which includes means for feeding particulate material at a controllable rate into said side zones adjacent one end of said trough and means for withdrawing at a controllable rate, treated particulate material from adjacent the other end of said trough.

6. Apparatus for coating and granulating particles in fluidized bed consisting essentially of a trough having a pair of upstanding side walls and a base, a pair of upstanding divider plates spaced apart and from said side walls and said base and disposed entirely between said side walls dividing said trough longitudinally into a central zone and a pair of side zones, particle feed means communicating into said side zones adjacent one end of said trough for introducing particulate material continuously at a controlled rate into said trough and treated particle discharge means for discharging treated particles from adjacent the other end of said trough continuously at a controlled rate and means for delivering substantially uniformly across said base, a substantial volume of fluidizing gas, said base including central apertured means disposed along the central strip thereof underlying said central zone, arranged to pass fluidizing gas into said central zone at a substantially uniform particle fluidizing first flow rate, and side apertured means disposed along the side strips of said base underlying said side zones, arranged to pass fluidizing gas into said side zones at a substantially uniform particle fluidizing second flow rate, means for adjusting said first and second flow rates to induce a substantially helical means path of particle flow around said tendency to deposit spray on the walls. Further the particles have a horizontal velocity component as they flow from zone 6 to zone 5 and thus its path is inward toward the center of zone 5 until that component is dissipated and the path continues upwardly. The flow pattern illustrated in FIGURE 5 shows this effect in that there tend to be no, or few particles in regions *b*. If the zone is too narrow the path of a particle from one zone 6 may intersect that from the other zone 6 and there will be resulting undesirable turbulence.

The height of the fluidized bed in central zone 5 obviously must be above the top of plates 4. For desirable operation in most applications, if the fan, the input and the output are stopped, then the static height of the unfluidized bed in zone 5 is preferably about half of the height of the unfluidized beds in zones 6.

The height of the fluidized beds in side zones 6 can be increased by increasing input of particles. If there is turbulence throughout zones 6 then the operation generally can be improved by adding input to increase the height of the bed in zones 6 until stable flow is achieved.

The respective aperture areas for central zone 5 and side zones 6 provide a particularly useful control for achieving desirable particle flow when the same machine is used for different applications. When one fan is used to provide air to zone 5 and to zones 6 which is a convenient arrangement, it has been found that the preferred ratio of aperture areas between zone 5 and zones 6 ranges between about 1:1 to 1:3 when the ratio of the horizontal areas of zone 5 and zones 6 is about 1:3. When there is good fluidization in zone 5 with a nice flat mushroom but there is inadequate fluidizing in zones 6 then the aperture areas in zones 6 may be increased as by means herinafter described toward achieving adequate particle circulation. If this increase interrupts adequate operation in zone 5 by too great a reduction of the pressure then the air flow can be increased by opening the air intake of the fan.

The fan speed and design should be sufficient to provide required pressure differential to lift the particles in the required application to above plates 4 to the mushroom. The flow of air or other fluidizing gas must be sufficient to lift the subject particles through that required distance in the environment of the device being used. The flow required for low density particles is less than that for high density particles. There is a shape factor to which aerodynamic principles have application but to which the environment in the machine provide some limitation. To the eye the stable "helical flow" of this invention is sufficiently apparent that there should be no difficulty in ascertaining the flow required for a particular application by trial. A main control for a given machine is the air intake for the fan. If there is some flow above plates 4 into zones 6, but particles drop back into zone 5 and spouting appears then air flow should be increased. If the fluidized bed is substantially higher than the top of plates 4 but there is random distribution at the top and spouting then the aperture area of zone 5 should be decreased. A static pressure capacity of 4 inches of water is generally adequate to fluidize particles having a density up to about 2 to a height of at least about one foot.

Further control may be achieved by putting a partial cover over the trough which will reduce the air volume flow and raise the pressures within the device. Further a suction can be drawn on the top of the device using a cover, which will increase the volume and the pressure drop. Suitable coating recovery means can be associated with a cover if desired.

The flow pattern represented in FIGURE 5 illustrates by the arrows the rotational movement of particles about divider plates 4. The particles in central zone 5 rise to mushrooming region above the top of the plates 4 where the particle density is greater than in zone 5. As the particles fall into side zones 6 there are light particle density regions at *c* and similarly as the particles move across base 2 from zones 6 to zone 5 there are light particle density regions at *b* because of the lateral momentum which the particles achieve. The aforementioned tendency of the fluidizing gas to peak in zones 6 is represented at *p*. There is a region *e* adjacent base 3 along the longitudinal center line of the trough into which very few particles will enter which therefore provides an excellent region into which to atomize coating material to commence the dispersion thereof within the zone.

In many applications it will be desirable to provide special means to improve particle circulation in lower side regions 22 of the trough 1. The inward horizontal pressure drop adjacent regions 22 may not be sufficient to cause particles to move horizontally therefrom and a stagnant triangle of particles may form along the corners in regions 22. FIGURE 4 illustrates one way of dealing with this problem. In the corner strip 23 of base 1 a plurality of apertures 24 are provided such that the ratio of open area to closed area in corner strip 23 is substantially greater than that for the remainder of side strip 8. These apertures 24 may be sufficient to avoid stagnation in the corners because the air flow from the apertures will tend to bend inwardly under the influence of the falling bed and provide a horizontal force component to a particle from the corner which is under its influence. Further means may be provided as shown in FIGURE 4 by including within housing 17 a side wall corner strip 25 having apertures 26 therein. The air stream from apertures 26 will be in part a direct horizontal force component to the particles in the corner. As shown in FIGURE 5 there is a tendency for the air flow from side strip 8 to peak as represented by dotted line *d*. The increased air flow from apertures 24 or apertures 24 and 26 provide increased fluidization for the concentration of particles which tends to form on the outer side of the peak *d* while the flow into central zone 5 avoids under concentration of particles on the inner side of peak *d*.

FIGURE 6 illustrates a desirable arrangement for air flow control in the central and side zones 5 and 6, respectively. A screen 27 is provided to prevent the remaining particles from falling into the housing 17 when operation of the machine is stopped. A conventional honeycomb member 28 is disposed beneath the screen 27 to improve air flow uniformity and central perforated plate 29 is removably mounted under honeycomb 28 beneath central zone 5 as for example on rails 30. Side perforated plates 31 are similarly removably mounted under honeycomb 28 beneath side zones 6. The perforations in the plates 29 and 31 are preferably uniformly positioned and are of such number and size that the ratio of the open area of central plate 29 to the sum of the open areas in plates 31 is preferably from 1:1 to 1:3.

It will be recognized that corner perforated plates may also be provided if desired to increase the open areas for the corner regions 22 corresponding to apertures 25 in the embodiment of FIGURE 4.

A variety of equivalent structures may be used to achieve adjustability of the open areas of the central strip 7 and the side strips 8 of the base. For example each of elements 29 and 31 may comprise a pair of superposed perforated plates longitudinally slidable with respect to each other so that the open area may be varied from a maximum to zero.

FIGURES 7 and 8 illustrate a discharge arrangement which will permit a measure of control of the treated particle discharge rate. Discharge end wall 32 joins side walls 2 to close the trough at the discharge end. End wall 32 has a first vertical series of discharge apertures 33 therein communicating into one side zone 6 and a second vertical series thereof 34 communicating into the other side zone 6, providing pairs of discharge apertures communicating with side zones 6 at a plurality of heights. Chutes 35 are fixed to the end wall 32 on the outside of the trough 1 to guide particles from each discharge aperdivider plates and means for dispersing particle treating material into said central zone.

References Cited

UNITED STATES PATENTS

| | | | |
|---|---|---|---|
| 2,586,818 | 2/1952 | Harms | 117—100 X |
| 2,795,318 | 6/1957 | Morris | 117—100 X |
| 3,196,827 | 7/1965 | Wurster et al. | 118—62 X |
| 3,241,520 | 3/1966 | Wurster et al. | 118—62 |

WILLIAM D. MARTIN, *Primary Examiner.*

MATHEW R. P. PERRONE, Jr., *Assistant Examiner.*

U.S. Cl. X.R.

117—100; 118—62, 303

Disclaimer and Dedication 3,437,073.—*Edwin George Drake*, La Salle, Quebec, and *Marius Frechette*, Ville St. Michel, Quebec, Canada. METHOD AND APPARATUS FOR TREATING PARTICULATE MATERIAL IN A FLUIDIZED BED. Patent dated Apr. 8, 1969. Disclaimer and dedication filed June 4, 1970, by the assignee, *Wisconsin Alumni Research Foundation*.

Hereby disclaims and dedicates the entire patent to the Public.
[*Official Gazette July 21, 1970.*]